United States Patent
Kristensen et al.

(10) Patent No.: US 8,015,854 B2
(45) Date of Patent: Sep. 13, 2011

(54) MECHANISM FOR FEEDING BLANKS TO BE THREADED INTO A THREAD ROLLING MACHINE

(75) Inventors: Martin Borchsenius Kristensen, Risskov (DK); Jorgen Duelund Nielsen, Risskov (DK)

(73) Assignee: Enkotec A/S (DK)

( * ) Notice: Subject to any disclaimer, the term of this patent is extended or adjusted under 35 U.S.C. 154(b) by 1143 days.

(21) Appl. No.: 11/641,290

(22) Filed: Dec. 19, 2006

(65) Prior Publication Data

US 2008/0141748 A1     Jun. 19, 2008

(51) Int. Cl.
*B21D 22/00* (2006.01)
*B23Q 3/00* (2006.01)

(52) U.S. Cl. .............. 72/420; 29/464; 29/822; 198/389; 198/467.1; 470/50

(58) Field of Classification Search .................. 198/389, 198/467.1, 662–667, 671, 672; 29/464, 822; 72/420, 421; 470/50, 176
See application file for complete search history.

(56) References Cited

U.S. PATENT DOCUMENTS

| | | | | |
|---|---|---|---|---|
| 2,377,431 A * | 6/1945 | Lakso | .......................... | 198/382 |
| 2,390,121 A * | 12/1945 | Poupitch | .......................... | 470/50 |
| 3,026,991 A * | 3/1962 | Kinsley | .......................... | 198/661 |
| 3,244,270 A * | 4/1966 | Wohlnick | .......................... | 198/663 |
| 3,652,369 A * | 3/1972 | Della Vite | .......................... | 156/566 |
| 3,914,814 A * | 10/1975 | Beissner | .......................... | 470/50 |
| 4,969,348 A * | 11/1990 | Clowes et al. | .......................... | 72/361 |
| 5,864,937 A * | 2/1999 | Cecil et al. | .......................... | 29/464 |

* cited by examiner

*Primary Examiner* — David Jones
(74) *Attorney, Agent, or Firm* — Day Pitney LLP

(57) ABSTRACT

The present invention relates to means for feeding blanks into the thread rolling part of a thread rolling machine in accurate timing and accurate position. A transport screw for transporting blanks e.g. in a thread rolling machine is disclosed, said transport screw comprises a transport helix for transporting a blank along said transport screw when said transport screw rotates, said transport screw further comprises a feeding area being a widening of said transport helix, whereby said feeding area can receive and feed said blank into said transport helix upon rotation of said transport screw. Further, a method of feeding blanks into a transport screw and a feeding system comprising a transport screw, a blank height adjustment mechanism and a blank alignment mechanism are disclosed.

15 Claims, 5 Drawing Sheets

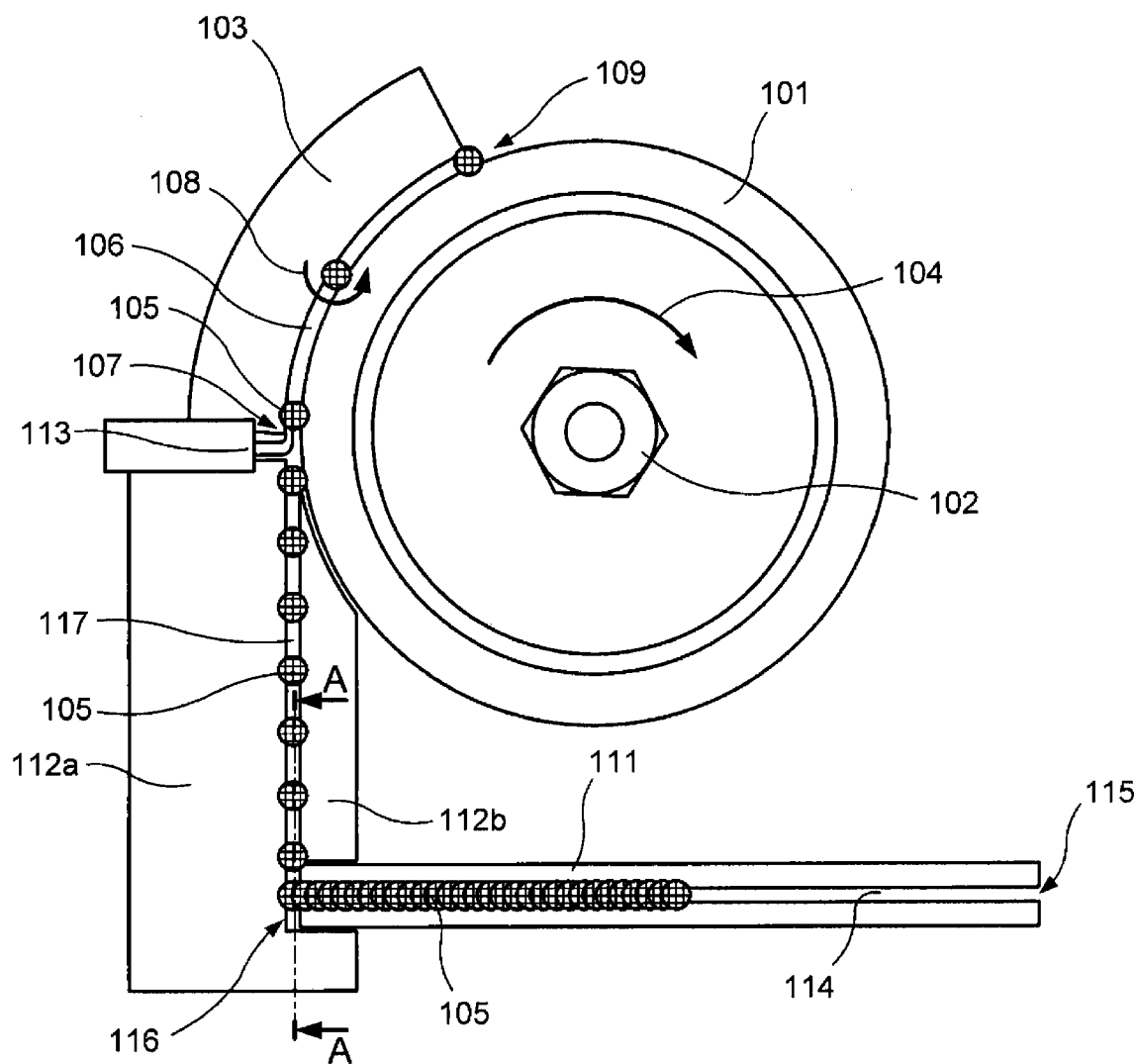
F I G. 1

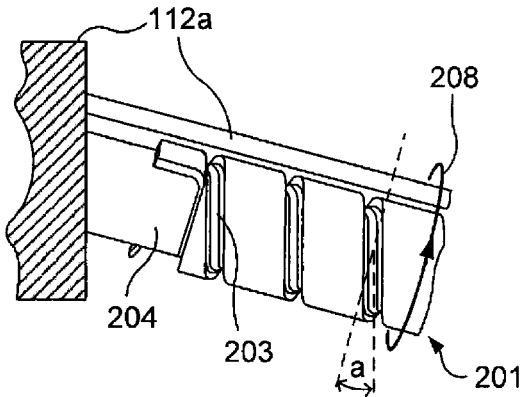
F I G. 2a
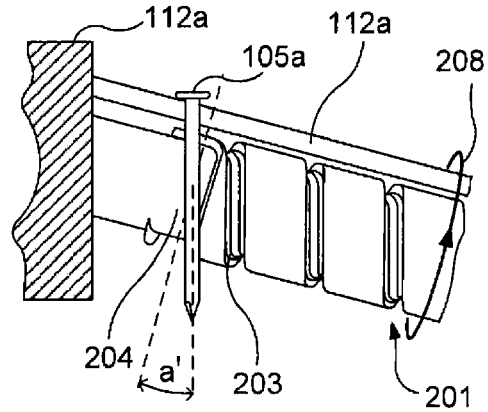
F I G. 2b
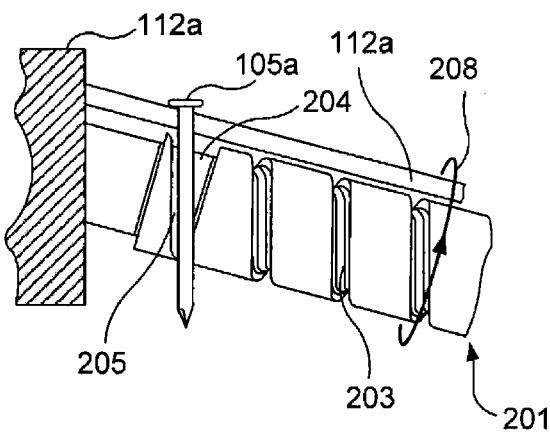
F I G. 2c
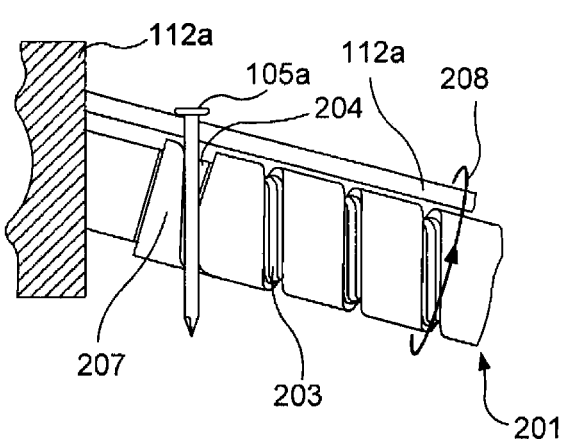
F I G. 2d
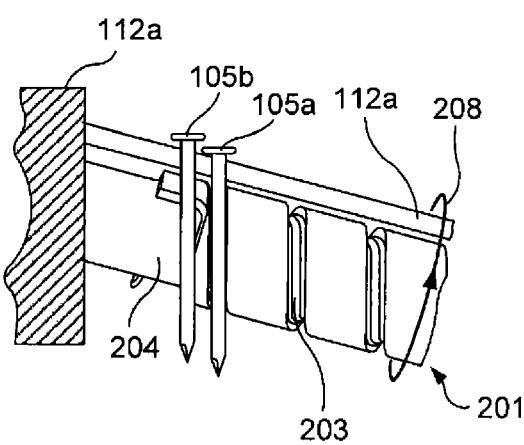
F I G. 2e
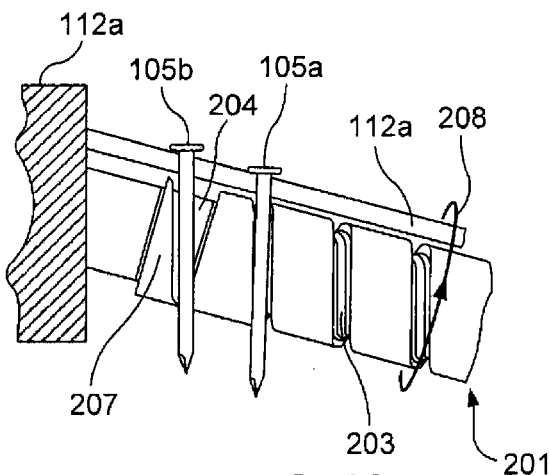
F I G. 2f

MECHANISM FOR FEEDING BLANKS TO BE THREADED INTO A THREAD ROLLING MACHINE

FIELD OF THE INVENTION

The present invention relates to a thread rolling machine and a feed mechanism for feeding blanks into thread rolling machines.

Screws and threaded nails such as annular and helical nails are often produced by the use of a thread rolling machine where unthreaded blanks are inserted into the thread rolling machine and threaded into a predetermined thread pattern. The thread is formed by rolling the blanks between a first and a second patterned surface in a thread rolling part of the thread rolling mechanism. The thread rolling mechanism often comprises a rotary die and a stationery die both comprising means for rolling the blanks into a predetermined thread pattern. The blanks are inserted into a gap between the rotary die and the stationary die and will, due to rotation of the rotary die, be transported through the gap while they are rolled.

Each of the patterned surfaces will form their own profile on the blank. The two profiles must coincide or be aligned when rolling helical profiles or annular profiles. This alignment will be achieved by adjusting the height of the patterned surfaces and adjusting it to the other patterned surface when rolling annular profiles. When rolling helical profiles the alignment will be achieved by feeding the blanks into the thread rolling machine at a very accurate timing. Furthermore, the blanks need to be fed into the thread rolling part at an accurate position. If the blanks are not fed into the thread rolling part in an accurate position and/or not fed into the thread rolling machine at an accurate timing, the probability of errors and the wear on the patterned surfaces increase dramatically. Furthermore, inaccurate feeding of the blanks could also result in damage of the thread rolling machine, with repairing costs and downtime in production as a consequence.

The manufacturers of screws and threaded nails would also increase production speed and rate such that a larger number of screws and threaded nails could be produced within a shorter time interval. The above mentioned problems would be more likely to occur when increasing the production speed/rate.

OBJECT AND SUMMARY OF THE INVENTION

The object of the invention is to provide means for feeding blanks into the thread rolling part of a thread rolling machine in accurate timing and accurate position and thereby solve the above mentioned problems.

This is achieved by a transport screw for transporting blanks e.g. in a thread rolling machine, said transport screw comprises a transport helix for transporting a blank along said transport screw when said transport screw rotates, said transport screw further comprises a feeding area being a widening of said transport helix, whereby said feeding area can receive and feed said blank into said transport helix upon rotation of said transport screw.

Hereby it is achieved that blanks can be fed into a transport screw very precisely and accurately at high speed and thereafter be transported and fed into the thread rolling part of a thread rolling machine. The widening of the helix makes it easier to insert the blanks into the helix, because it is possible to insert blanks in the entire widening. The consequence is that the blanks can be inserted into the helix in a larger time interval compared to when inserting the blanks directly into the helix. Further, the blanks do not need to be aligned with the helix prior to feeding the blanks into the transport screws, since this can be achieved by the feeding area. The consequence is that the process of inserting the blanks into the transport helix is much more stable, meaning that the amount of errors occurring while inserting blanks into the helix will be reduced. One further advantage is that the blanks could be fed to and inserted into the transport helix from a direction substantially perpendicular to the helix which makes it possible to make a more compact thread rolling machine and whereby space is saved. The transport screw would feed one blank into the thread rolling machine per revolution and could therefore easily be designed to feed the blanks at a very accurate timing by adjusting the rotation of the transport screw according to the thread rolling part. The inclination of the helix could be designed in order to adjust the distance between the blanks during transportation and/or to synchronize the translatory speed of the blanks when being fed into the thread rolling part with the translatory speed of the blanks in the thread rolling part.

In another embodiment of the transport screw, the feeding area comprises at least one guiding edge for guiding said blank into said transport helix upon rotation of said transport screw. Hereby it is achieved that the blank could be automatically guided into the transport helix when the transport screw rotates. The guiding edge could further be adapted to align the blank such that it could easier be fed into the helix.

In another embodiment of the transport screw said guiding edge is an extension of at least a part of said transport helix. Hereby it is achieved that the blank would automatically be aligned with and guided into the transport helix.

In another embodiment the transport screw comprises a cylindrical rod where said transport helix is formed as a transport groove in said cylindrical rod. The helix can hereby becomes very robust and the helix could be rotated by rotating the cylindrical rod—for instance by a motor. Furthermore, the helix could be formed by using standard forming techniques, such as milling, which makes it simpler to form the helix and thereby save production expenses. The blanks would be transported in the transport groove and at the same time be guided and supported by the transport groove.

In another embodiment of the transport screw the feeding area is formed as a feeding recess in said cylindrical rod. Hereby the transport screw can be produced in one peace whereby production costs are reduced. The feeding recess could be milled in the cylindrical rod such that it would be in connection with the transport groove.

In another embodiment the transport screw feeding area is formed as a feeding recess in a bush adapted to be mounted onto said cylindrical rod. Hereby a flexible solution of the transport screw is provided because it is possible to form a number of different feeding areas on different bushes. The bushes mounted onto the cylindrical rod could therefore be changed thereby making it possible to design a number of different feeding areas for the cylindrical rod. The consequence is that the cylindrical rod comprising the helix could be used together with at number of different feeding areas simply by changing the bush. The bush could be mounted by fastening it to one of the ends of the cylindrical rod—for instance by screwing the bush onto a thread in the end of the cylindrical rod. Further, this embodiment makes it possible to form the transport screw even without access to a multi axial machining center In another embodiment of the transport screw at least a part of said transport screw is made of metal. Hereby the transport screw could be made of a very robust material such that the life time of the transport screw would be expanded.

In another aspect the present invention also relates to a method of inserting blanks into a transport screw for transporting blanks, where said transport screw comprises a transport helix for transporting blanks along said transport screw when said transport screw rotates, and where said transport screw further comprises a feeding area being a widening of said transport helix, said method comprises a step of inserting a blank into said feeding area and a step of guiding said blank into said transport helix upon rotation of said transport screw. Hereby the same advantages as described above are achieved.

In another embodiment of the method of inserting blanks into a transport screw said step of guiding said blank into said transport helix comprises the step of aligning said blank along a guiding edge being a part of said feeding area. Hereby the same advantages as described above are achieved.

The present invention further relates to a feeding system for feeding blanks into a thread rolling part of a thread rolling machine for rolling threads on blanks comprising a head and a body, wherein said thread is formed by rolling said blanks between a first and a second patterned surface in said thread rolling part, said body is fed into said thread rolling part via a feeding chute supporting said head, and said feeding system further comprises a transport screw as described above, and said transport screw transports said blanks through said feeding chute. Hereby the same advantages as described above are achieved.

In another embodiment of the feeding system, said feeding system further comprises a height adjustment mechanism for adjusting the distance between said head and said thread, said height adjustment mechanism comprises: a supporting surface comprising a first end and a second end for supporting the head of said blanks while they are being transported from said first end to said second end and when said blanks are delivered from said second end to said thread rolling part, and adjusting means for adjusting the inclination of at least a part of said supporting surface and thereby adjusting the position of said second end relative to said thread rolling machine and thereby adjusting the distance between said head and said thread to be rolled by said thread rolling part.

Hereby it is possible to adjust the distance between the head of the blanks and the thread being rolled onto said blank while feeding the blanks into the thread rolling part. This is achieved by lowering or elevating the supporting surface such that the blanks are fed into the thread rolling part in a predetermined height. The predetermined height could be adjusted according to the types of blanks being threaded in the thread rolling machine.

In another embodiment the feeding system further comprises an alignment mechanism for aligning said blanks to be fed into said thread rolling part, said alignment mechanism comprises an alignment surface for holding said blank until said blank is in contact with the main part of said alignment surface and thereby aligning said blanks before they are fed to said thread rolling part. Hereby it is possible to align the blanks and ensuring that they would be accurately fed into the thread rolling part. The alignment surface would hold the blank until the main part of the blank is aligned with the alignment surface and the blank would thereafter be fed into the thread rolling machine. The alignment surface could for instance be adapted to align the blank in an upright position parallel to the patterned surfaces. Errors due to inaccurate feeding of the blanks could therefore be avoided causing in a stable and reliable production of threaded blanks.

The present invention also relates to a height adjustment mechanism for a thread rolling machine for rolling threads on blanks comprising a head and a body, said adjustment mechanism is for adjusting the distance between said head and said thread, said adjustment mechanism comprises a supporting surface comprising a first end and a second end for supporting the head of said blanks while they are being transported from said first end to said second end and when said blanks are delivered from said second end to said thread rolling machine, and adjusting means for adjusting the inclination of at least a part of said supporting surface and thereby adjusting the position of said second end relative to said thread rolling machine and thereby adjusting the distance between said head and said thread to be rolled by said thread rolling machine. Hereby the advantages concerning the adjustment of the distance between the head of the blanks and the thread as described above are achieved.

In another embodiment of the height adjustment mechanism said blanks are transported from said first end to said second end by a transport screw as described above. Hereby the advantages concerning the adjustment of the distance between the head of the blanks and the thread as described above are achieved.

The present invention also relates to an alignment mechanism for aligning blanks to be fed into a thread rolling part of a thread rolling machine, said thread rolling machine further comprising a feeding system for feeding blanks to said thread rolling part via said alignment mechanism, wherein said thread is formed by rolling the blanks between a first and a second patterned surface in said thread rolling part, said alignment mechanism comprises an alignment surface for holding said blank until the blank is in contact with the main part of said alignment surface and thereby aligning said blanks before they are fed to said thread rolling part. Hereby the advantages concerning the alignment of the blanks as described above are achieved.

In another embodiment of the alignment mechanism, said feeding system comprises a transport screw as described above and in that said blank is fed to said alignment surface by said transport screw. Hereby the advantages concerning the alignment of the blanks as described above are achieved.

BRIEF DESCRIPTION OF THE DRAWINGS

In the following preferred embodiments of the invention will be described referring to the figures, where FIG. 1 illustrates a structural overview of the feeding system and thread rolling part according to the present invention, FIG. 2 illustrates a cross sectional view of the screw feeding point taken along line A-A in FIG. 1.

DESCRIPTION OF EMBODIMENTS

Figure 3:
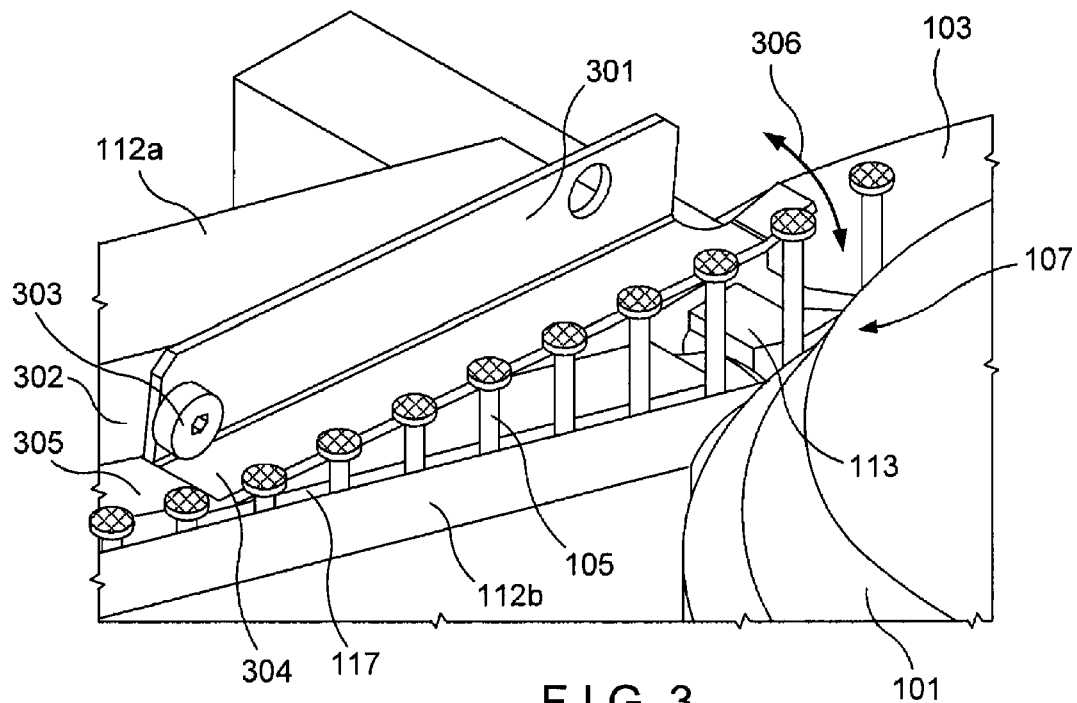
FIG. 3 illustrates an enlarged isometric view of the feeding point.

FIG. 1 illustrates a structural overview of the feeding system and the thread rolling part seen from above. The tread rolling part comprises a rotary die (101) fastened to a rotary axis and a stationary die (103). The rotary die rotates around the rotary axis as illustrated by arrow (104) and blanks (105) are fed into the gap (106) between the rotary die and the stationary die at a feeding point (107) and the blanks would thereafter rotate (108) and be transported through the gap to an exit point (109). The blanks would be rolled according to the patterned surfaces defined by the rotary and stationary die while they rotate through the gap whereby threaded blanks would exit the thread roller at the exit point (109).

The feeding system comprises a slide chute (111), a transport screw housing (112a, 112b) comprising a transport screw (not shown in FIG. 1) and an alignment mechanism (113). The sliding chute is adapted to support the head of the blanks such that the blank body would hang freely in the chute gap (114). The blanks are fed into the sliding chute at the feeding end (115) by any kind of mechanism known in the prior art. The sliding chute is angled and the blanks would due to gravity slide through the chute and be delivered by the sliding chute at the transport screw feeding point (116). The sliding chute would also function as a blank buffer meaning that a number of blanks should be fed into the sliding chute before blanks are fed into the transport screw is chute, such that blanks are always available to be fed into the transport screw chute at the slide chute. Thereby delays due to fluctuations in feeding rate caused by the mechanism feeding blanks into the sliding chute are avoided.

The transport screw housing comprises a first transport screw housing (112a) and a second transport screw housing (112b) between which the transport screw (not shown) is placed and a transport screw chute (117) is created above the transport screw by the first and second transport screw housings. The transport screw comprises a transport helix into which the blanks can be fed and thereafter transported through the transport screw chute to the alignment mechanism (113) due to rotation of the transport screw. The blanks would in the illustrated embodiment be fed into the helix of the transport screw at the feeding point (116) and the process of feeding the blanks into the transport screw will be explained below. The transport screw would be adapted to feed the blanks into the thread rolling part at a predefined feeding rate in order to ensure that the blanks are fed into the thread rolling part at a correct timing such that the blanks would be threaded correctly. The transport screw would feed one blank into the thread rolling part per revolution and could therefore easily be designed to feed the blanks at a very accurate timing by adjusting the rotation of the transport screw according to the thread rolling part. The inclination of the helix could be designed in order to adjust the distance between the blanks during transportation and/or to adjust the translatory speed of the blanks when being fed.

FIGS. 2a-2f illustrate a cross sectional view of the transport screw chute (117) taken along line A-A in FIG. 1. The figures illustrate how the blanks (105) are fed into the transport screw (201) at the transport screw feeding point. The transport screw (201) is placed between the first transport screw housing (112a) and the second transport screw housing (not shown in FIG. 2) such that it is placed inside the transport screw chute (117). The transport screw chute is constructed such that the heads of the blanks would be supported by the first transport screw housing (112a). The transport screw chute can be constructed in a way where the head of the blanks are supported by the second transport screw housing or by both the first and the second transport screw housing.

FIG. 2a illustrates the transport screw at first position and FIGS. 2b, 2c, 2d, 2e and 2f illustrate the transport screw in a second, a third, a fourth, a fifth, and a sixth position rotated approximately 90, 180, 270, 360, 540 degrees compared to the first position, respectively. The arrow (208) indicates the direction of rotation The transport screw is embodied as a cylinder and the transport helix is formed as a transport groove (203). The transport screw further comprises a feeding area formed as a feeding recess (204). The transport groove is embodied as a helix forming a worm drive into which a blank can be fed and transported from one end of the transport screw to another end by rotating the transport screw. The feeding recess (204) is embodied as a recessed section at one end of the transport screw and is in connection with the transport groove. The cross sectional area of the feeding recess is bigger than the cross sectional area of the transport groove, and blanks can therefore easily be inserted into the feeding recess from the slide chute when the feeding recess is turning towards the slide chute. FIG. 2b illustrates the situation where a blank (105a) has been inserted into the feeding recess from the slide chute. The figures illustrate that the blanks are inserted into the feeding recess in a tilted position with an angle (a') substantially equal to the groove angle (a). This could be achieved by placing the transport screw in an inclined position that corresponds to the groove angle (a) as illustrated, or for instance by tilting the slide chute such the blanks would be fed into the feeding recess in the tilted position. Only one blank would be inserted at this time because the first blank would block and prevent a second blank from being inserted. The first blank would be aligned along a guiding edge (205) as illustrated in FIG. 2c, and the guiding edge is in this embodiment an extension of a part of the transport groove, and the blank would automatically be fed into the transport groove when the transport screw rotates as illustrated in FIG. 2c. The blanks could also be fed into the transport groove by using air pressure to push the blank from the feeding recess and into the transport groove. FIG. 2d illustrates the situation where a first blank (105a) has been fed into the transport groove and where a second blank (not shown in FIG. 2d) is waiting to be inserted into the feeding recess (204). However, the second blank cannot at this time be inserted into the feeding recess because the outer surface (207) of the transport screw would prevent the blank from being inserted into the feeding recess. FIG. 2e illustrates the situation where the transport screw has rotated one revolution such that a second blank (105b) could be inserted into the feeding recess and thereafter be fed into the transport groove similar to the first blank (105a). The situation where the second blank is fed into the groove is illustrated in FIG. 2f.

Figure 6:
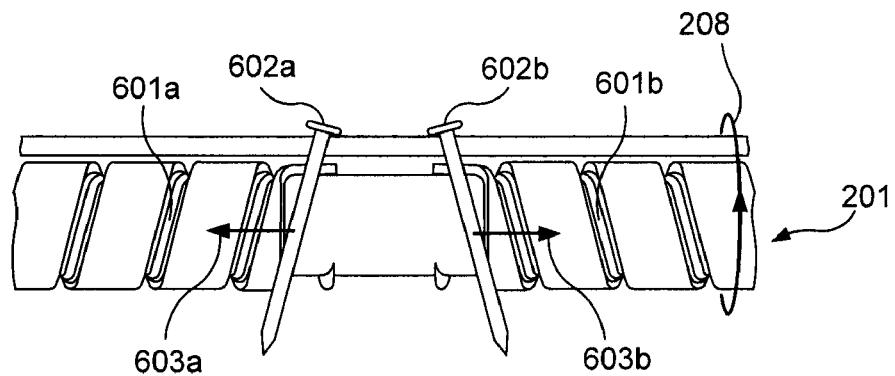
FIG. 6 illustrates another embodiment of the transport screw and FIG. 7 illustrates an embodiment of a feeding system including two transport screws.

FIG. 6 illustrates another embodiment where the transport screw (201) is embodied with two transport grooves (601a, 601b) and with two feeding recesses. The two transport grooves are placed at the first and second end of the transport screw, and the helix of the transport grooves is constructed with opposite windings such that blanks (602a, 602b) inserted in the two transport grooves would be transported in opposite directions along the transport screw as indicated by arrows (603a, 603b). The two feeding recesses would therefore be adapted to feed the blanks into each of the transport grooves. Hereby is it possible to simultaneously feed two blanks into the transport screw and thereafter transport the two blanks in opposite directions for instance to two different thread rolling parts.

Figure 7:
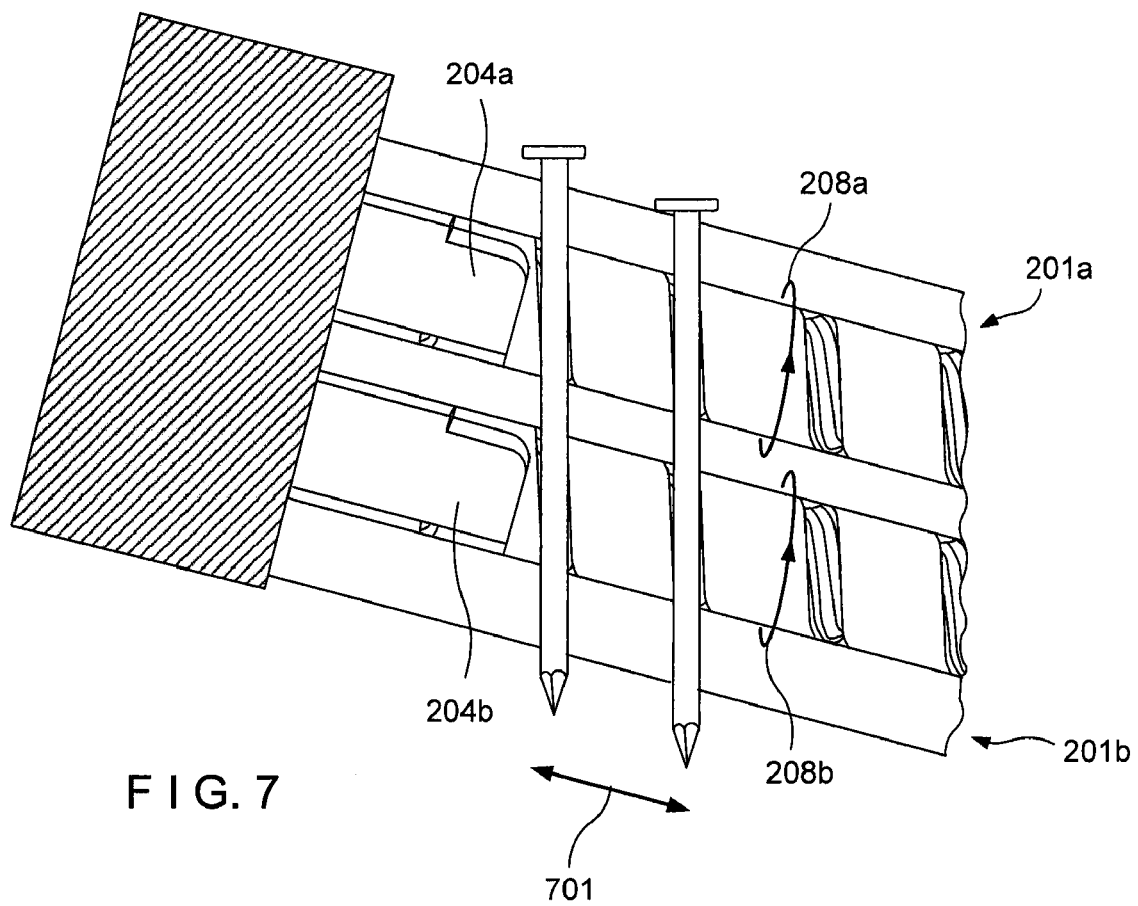

FIG. 7 illustrates another embodiment where feeding, alignment and transport of the blanks comprise a second transport screw (201b) placed below the first transport screw (201a). The upper part of the blank body would be transported by the first transport screw as described above, and the lower part of the blank body would be transported by the second transport screw. Mutual placement of the transport screws and the transport grooves makes it possible to adjust the vertical position of the blanks while they are being transported and/or fed. This could for instance be achieved by displaying the second transport screw at a distance along the first transport screw as illustrated by arrow (701), such that the lower part of the blank would be transported at a distance ahead of the top part of the blank. The two transport screws would in this situation be synchronized in speed such that the blanks would be transported through the two transport screws with the same speed. The vertical position of the blank could be adjusted by adjusting and mutually displaying the transport screws as indicated by arrow (701) or by adjusting the length of the two transports screws. The consequence is that the lower and upper parts of the blanks could be adjusted according to each other and therefore be fed into the thread rolling part in a predetermined position. Both transport screws comprise a feeding recess similar to the feeding recess (204a, 204b), such that the blank could easily be fed into the transport grooves.

In another embodiment the two transport screws rotate at different speeds (208a, 208b) causing either the lower or top part of the blank to be fed faster through the transport screw. The consequence is that the vertical inclinations of the blanks change while the blank is transported through the two transport screws.

The transport screw is in one embodiment constructed in one piece for instance by milling the transport groove and the feeding recess into a cylindrical rod. However, the transport screw could in another embodiment be constructed in two pieces where the transport groove has been milled into a first rod and where the feeding recess is milled into a bush that can be screwed onto the end of the first rod such that the feeding recess and the transport groove would get in connection as described above.

FIG. 3 illustrates an enlarged isometric view of the feeding point (107) and shows an alignment mechanism (113) according to the present invention, the first and second transport screw housing (112a, 112b), the rotary die (101) and the stationary die (103). The blanks (105) are transported through the transport screw chute (117) towards the feeding point by the transport screw as described in FIGS. 2a-2f. The first transport screw housing (112a) comprises in this embodiment height adjustment means adapted to elevate the blanks so that they would be fed into the thread rolling part at a predetermined height. The consequence is that only the lower part of the blank body would be threaded by the thread rolling part. The height adjustment means is in this embodiment carried out as an angle bracket (301) fastened to a fastening edge (302) at the first transport screw housing (112a) by a fastening means (303) such as bolts and/or nuts. The bottom part (304) of the angle bracket is aligned with the blank supporting part (305) of the first transport screw housing such that the blank heads can easily slide onto the angle bracket. The angle bracket can be elevated and lowered as illustrated by arrow (306) and the height of the blanks can therefore be adjusted to a predetermined height dependent on the kind/type of blanks to be threaded.

The second transport screw housing (112b) comprises in another embodiment a second angel bracket that is aligned with the blank supporting part of the second transport screw housing. The second angle bracket would be adjusted to the same height as the first angle bracket and thereby it is achieved that the blank heads would be supported on both sides when they are elevated. This embodiment makes it possible to support nail blanks with D-shaped head and furthermore support nail blanks with offset shaped head.

Figure 4A:
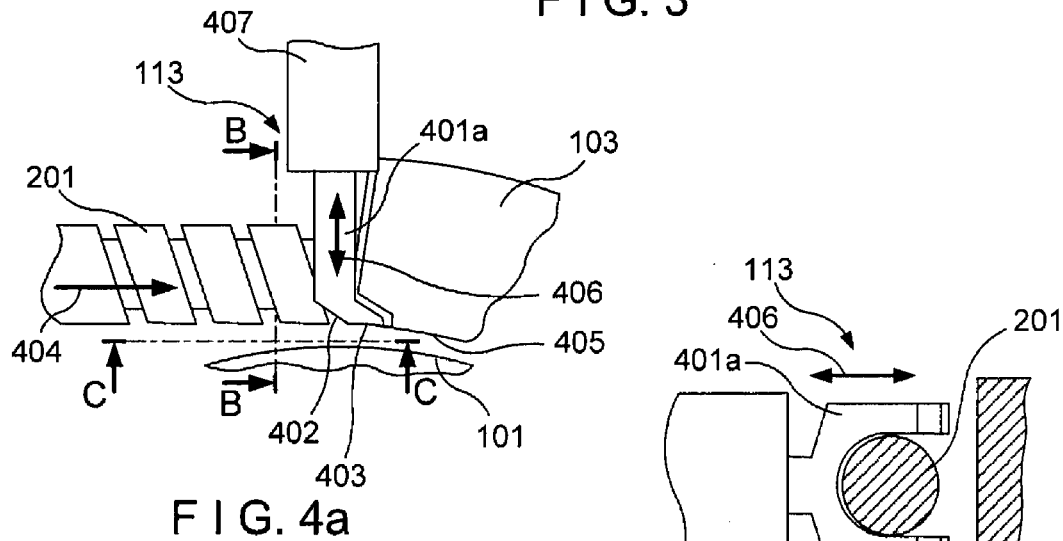
FIGS. 4a-4c illustrate an enlarged view of the feeding point.
Figure 4B:
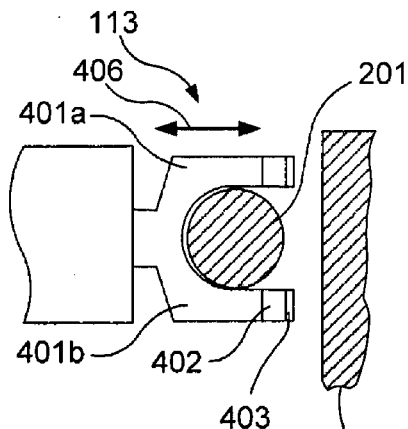
Figure 4C:
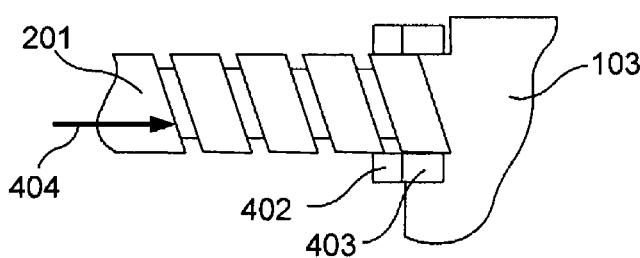

FIGS. 4a-4c illustrate an enlarged view of the feeding point where FIG. 4a illustrates the transport screw (201), an alignment mechanism (113) according to the present invention, the stationary die (103) and the rotary die (101) seen from above. FIGS. 4b and 4c illustrate cross sectional views taken along line B-B and line C-C of FIG. 4a, respectively. FIG. 4b illustrates that the alignment mechanism comprises a feeding arm formed as a fork comprising two fork arms (401a, 401b) between which the transport screw is placed, and where each fork arm comprises a receiving surface (402) and a feeding surface (403). The receiving surfaces are angled relatively to the transport direction (404) of the blanks as illustrated in FIG. 4a and adapted to receive and align the blanks while the blanks are still transported by the transport screw transport groove. The feeding surface has the same curvature as the threading surface (405) of the stationary die (103) and is adapted to feed the blanks into the thread roller. The fork enters a fork housing (407) and can be moved in the directions indicated by arrow (406) when a force is applied to the fork. The fork housing (407) comprising spring means (not shown) adapted to apply a spring force to the fork such that it is maintain in a position where the feeding surface (403) is aligned with the threading surface (405) of the stationary die. The consequence is that the feeding arm would hold the blanks until they are aligned by the receiving surface.

Figure 5A:
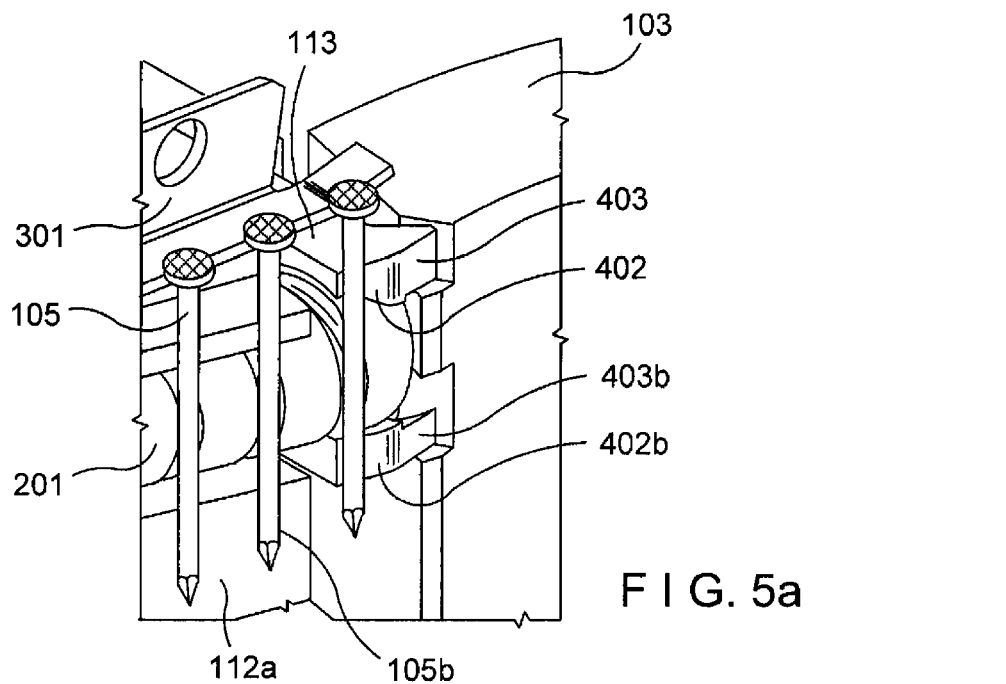
FIGS. 5a-5c illustrate an enlarged isometric view of the feeding point where the rotary die and the second transport screw housing have been removed.
Figures 5B, 5C:
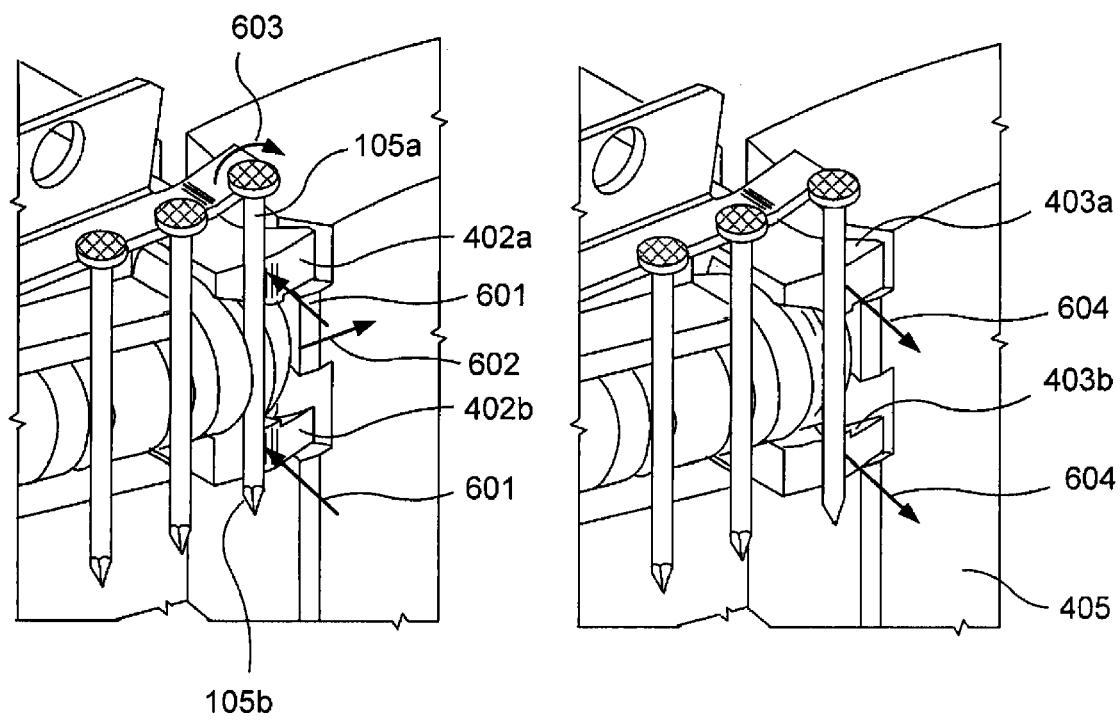

FIGS. 5a-5c illustrate an enlarged isometric view of the feeding point (107) where the rotary die and second transport screw housing have been removed and also how the blanks (105) are fed into the thread roller. The figures show the alignment mechanism (113), the first transport screw housing (112a) with the angle bracket (301), the stationary die (103) and the exposed transport screw (201). The blanks (105) are transported towards the feeding point when the transport screw rotates, and they would in the end of the transport screw be delivered at the alignment mechanism.

FIG. 5a illustrates that the lower part of the blank body (105b) will first be fed to the lower receiving surface of the lower fork arm (402b) due the fact that the blank is transported in an inclined position as described in FIG. 2f.

FIG. 5b illustrates that the fork arms would be pushed back as illustrated by arrows (601), because the lower part of the blank pushes the lower receiving surface back when the transport screw transports the blank forward (602). The result is that the blank would be aligned, indicated by arrow (603), into a vertical position when the upper part of the blank (105a) is fed to the upper receiving surface (402a).

FIG. 5c illustrates that the fork arms push (604) the blank out of the transport groove and into the thread roller in a vertical aligned position. The blank would further be aligned with the threading surface (405) of the stationary die due to the fact that the feed surfaces (403a, 403b) have the same curvature as the threading surface (405).

The consequence is that the blanks are fed into the thread roller with great accuracy, and the thread roller would therefore work with much higher stability, and the probability of malfunctions and errors on the threaded blanks would be avoided.

In another embodiment, the alignment mechanism comprises a receiving surface and a nail-stop surface. The receiving surface is adapted to receive and align the blanks and to push the aligned blanks to the surface of the rotary die. The mechanism comprises a mechanism to retract the fork-arm in order to remove the nail-stop surface. The retraction mechanism is controlled by the rotation of the transport screw, only allowing nails to be fed into the thread roller at an accurate timing and at an accurate vertical position.

The invention claimed is:
1. A transport screw for transporting blanks, said transport screw comprises:
    a transport helix for transporting at least one blank in a direction parallel to an axis of rotation of said transport screw when said transport screw rotates from a feeding end of said transport helix to a forward end, said transport screw further comprises a feeding recess at said feeding end of the transport helix, said feeding recess being an extension of said transport helix extending about a major portion of the circumference of the transport screw and having a cross sectional area initially bigger than a cross sectional area of the transport helix which tapers down to the cross section of said transport helix, said bigger cross sectional area being formed by modifying the feeding end of said transport helix, whereby said feeding recess can receive and feed said blanks into said transport helix upon rotation of said transport screw.

2. A transport screw according to claim 1 characterized in that said feeding recess comprises at least one guiding edge for guiding said blank into said transport helix upon rotation of said transport screw.

3. A transport screw according to claim 2 characterized in that said guiding edge is an extension of at least a part of said transport helix.

4. A transport screw according to claim 1 characterized in that said transport screw comprises a cylindrical rod and in that said transport helix is formed as a transport groove in said cylindrical rod.

5. A transport screw according to claim 4 further comprising a bush adapted to be mounted onto said cylindrical rod, wherein said feeding recess is formed in the bush.

6. A transport screw according to claim 1 characterized in that at least a part of said transport screw is made of metal.

7. A method of inserting blanks into a transport screw for transporting blanks, where said transport screw comprises:
a transport helix for transporting blanks along said transport screw when said transport screw rotates, and
where said transport screw further comprises a feeding recess embodied as a recessed section in connection with the transport helix, said feeding recess having a cross sectional area bigger than a cross sectional area of the transport helix,
said method comprises the steps of:
inserting a blank into said feeding recess:
guiding said blank into said transport helix upon rotation of said transport screw.

8. A method according to claim 7 characterized in that said step of guiding said blank into said transport helix comprises the step of aligning said blank along a guiding edge being a part of said feeding recess.

9. A feeding system for feeding blanks into a thread rolling part of a thread rolling machine for rolling threads on blanks comprising a head and a body,
wherein said thread is formed by rolling said blanks between a first and a second patterned surface in said thread rolling part,
said body is fed into said thread rolling part via a feeding chute supporting said head, and
said feeding system further comprises the transport screw of claim 1, and
said transport screw transports said blanks through said feeding chute.

10. A feeding system according to claim 9 characterized in that said feeding system further comprises a height adjustment mechanism for adjusting a distance between said head and said thread, said height adjustment mechanism comprises:
a supporting surface comprising a first end and a second end for supporting the head of said blanks while they are being transported from said first end to said second end and when said blanks are delivered from said second end to said thread rolling part,
adjusting means for adjusting an inclination of at least a part of said supporting surface and thereby adjusting a position of said second end relative to said thread rolling machine and thereby adjusting the distance between said head and said thread to be rolled by said thread rolling part.

11. A feeding system according to claim 9 characterized in that said feeding system further comprises:
an alignment mechanism for aligning said blanks to be fed into said thread rolling part,
said alignment mechanism comprises an alignment surface for holding said blank until said blank is in contact with a main part of said alignment surface and thereby aligning said blanks before they are fed to said thread rolling part.

12. A height adjustment mechanism for a thread rolling machine for rolling threads on blanks, said blanks comprising a head and a body,
said adjustment mechanism is adapted for adjusting a distance between said head and said thread, said adjustment mechanism comprises:
a supporting surface comprising a first end and a second end for supporting the head of said blanks while they are being transported from said first end to said second end and when said blanks are delivered from said second end to said thread rolling machine,
adjusting means for adjusting an inclination of at least a part of said supporting surface and thereby adjusting a position of said second end relative to said thread rolling machine and thereby adjusting the distance between said head and said thread to be rolled by said thread rolling machine.

13. A height adjustment mechanism according to claim 12 characterized in that said blanks are transported from said first end to said second end by a transport screw.

14. An alignment mechanism for aligning blanks to be fed into a thread rolling part of a thread rolling machine,
said thread rolling machine further comprising a feeding system for feeding blanks to said thread rolling part via said alignment mechanism,
wherein said thread is formed by rolling the blanks between a first and a second patterned surface in said thread rolling part,
said alignment mechanism comprises an alignment surface for holding said blank until the blank is in contact with a main part of said alignment surface and thereby aligning said blanks before they are fed to said thread rolling part.

15. An alignment mechanism according to claim 14 characterized in that said feeding system comprises a transport screw and in that said blank is fed to said alignment surface by said transport screw.

* * * * *